United States Patent
Mougin

(10) Patent No.: US 8,561,629 B2
(45) Date of Patent: Oct. 22, 2013

(54) METHOD AND A DEVICE FOR DRAINING A TANK, AND A TANK AND AN AIRCRAFT FITTED WITH SUCH A DEVICE

(75) Inventor: Stéphane Mougin, Rousset (FR)

(73) Assignee: Eurocopter, Marignane Cedex (FR)

( * ) Notice: Subject to any disclaimer, the term of this patent is extended or adjusted under 35 U.S.C. 154(b) by 383 days.

(21) Appl. No.: 13/013,301

(22) Filed: Jan. 25, 2011

(65) Prior Publication Data
US 2011/0180663 A1 Jul. 28, 2011

(30) Foreign Application Priority Data
Jan. 28, 2010 (FR) ..................... 10 00324

(51) Int. Cl.
*B67D 3/02* (2006.01)
*F16L 29/00* (2006.01)

(52) U.S. Cl.
USPC ............... 137/15.16; 137/15.08; 137/590; 137/614.05; 251/144

(58) Field of Classification Search
USPC ............ 137/614, 614.05, 798, 590, 15.08, 137/15.09, 15.16–15.18, 1; 251/149.1, 251/149.6, 149.7, 144
See application file for complete search history.

(56) References Cited

U.S. PATENT DOCUMENTS

| | | | | |
|---|---|---|---|---|
| 2,653,832 A * | 9/1953 | Carter | ............ | 251/149.9 |
| 3,879,013 A * | 4/1975 | Hajek, Jr. | ............ | 251/144 |
| 4,883,102 A * | 11/1989 | Gabrielyan et al. | ............ | 141/98 |
| 5,117,876 A * | 6/1992 | Kuntz | ............ | 141/7 |
| 5,209,456 A * | 5/1993 | Chronister | ............ | 251/144 |
| 5,546,986 A * | 8/1996 | Clark, II et al. | ............ | 137/614.05 |
| 5,667,195 A * | 9/1997 | McCormick | ............ | 251/149.6 |
| 8,312,889 B2 * | 11/2012 | Oltman et al. | ............ | 137/1 |
| 2005/0081949 A1 | 4/2005 | Kuntz | | |
| 2006/0254669 A1 | 11/2006 | Kuntz | | |

OTHER PUBLICATIONS

Search Report and Written Opinion, Application No. FR 1000324, dated Sep. 2, 2010.

* cited by examiner

*Primary Examiner* — Kevin Lee
(74) *Attorney, Agent, or Firm* — Brooks Kushman P.C.

(57) ABSTRACT

The present invention relates to a method of draining a tank (2) having a plate, the plate (12) including a canister (19) having an outer casing (20) provided with a base (19') that is pressed against the plate (12), the base (19') presenting at least one through orifice (21) suitable for being closed by a movable member (22) of the canister (19), the plate (12) carrying a pump (30) that co-operates with the canister (19) by actuating the movable member (22) to open the through orifice (21), during which method the pump (30) is removed from the canister (19) and then a fluid connector (50) is inserted to take the place of the pump (30), the fluid connector (50) co-operating with the canister (19) by actuating the movable member (22) to release the through orifice (21) in order to drain the tank (2) via the fluid connector (50).

20 Claims, 2 Drawing Sheets

METHOD AND A DEVICE FOR DRAINING A TANK, AND A TANK AND AN AIRCRAFT FITTED WITH SUCH A DEVICE

CROSS REFERENCE TO RELATED APPLICATIONS

This application claims the benefit of FR 10 00324 filed on Jan. 28, 2010, the disclosure of which is incorporated in its entirety by reference herein.

FIELD OF THE INVENTION

The present invention relates to a method and to a device for draining a tank, in particular a fuel tank of an aircraft of the rotorcraft type. Furthermore, the invention provides a tank having such a device, and an aircraft fitted with such a tank.

BACKGROUND OF THE INVENTION

Conventionally, a tank includes an orifice in its bottom portion, i.e. its portion closest to the ground, that is closed by a fitted plate that is referred to as a "fuel plate" if the tank is a fuel tank.

The fitted plate comprises a plate proper having an opening that is covered by a member known in the art as a "canister".

It should be observed that below and for convenience, in order to comply with the terminology used in the art, the term "plate" is used to designate the plate as such and the term "fitted plate" is used to designate the plate together with its accessories including the above-mentioned canister.

The canister comprises an outer casing that opens to a feed pipe, e.g. providing the connection between the tank and an engine, with a base of the canister being fastened to the plate. The base then possesses at least one through orifice for allowing the liquid contained in the tank to flow towards the feed pipe.

In addition, the fitted plate includes a pump fastened thereto, the pump passing through the opening in the plate in order to project into the inside of the casing. The pump then serves to cause the liquid to flow out from the tank through the canister. It should be observed that on a fitted plate of a fuel tank, the pump is usually referred to as a "booster" pump.

In order to avoid liquid escaping from the tank through the opening in the plate when the operator removes the pump, the canister includes a movable member, such as a resiliently sliding cylindrical member or a valve, for example, suitable for closing each of the through orifices when the pump is absent.

When the operator inserts the pump, the pump actuates the movable member, which slides inside the outer casing to open each through orifice. Conversely, when the operator removes the pump, the movable member returns to its original position, e.g. under drive from a spring, and closes each through orifice.

In addition, the fitted plate generally includes a quick drain cock for draining the tank quickly, or indeed regulation bleed means at its low point. The quick drain cock is permanently fitted to the plate.

Thus, the device provided for draining the tank comprises a cock that is arranged in permanent manner on a plate. More precisely, the device comprises a fitted plate comprising at least: a canister; a pump; and a quick drain cock.

It can thus be understood that the quick drain cock increases the weight of the fitted plate even though it is used only occasionally. Nevertheless, in the context of an aircraft fuel tank, maintenance operations are made easier by the presence of quick drain means. Merely eliminating such quick drain means as they stand does not appear to be possible.

SUMMARY OF THE INVENTION

The present invention thus has the object of proposing a method enabling a tank to be drained without requiring a quick drain cock to be permanently arranged on a plate.

The invention provides a method of draining a tank having a plate presenting an inside face facing the inside of the tank and an outside face opposite from the inside face, said plate including a canister having an outer casing provided with a base that is pressed in leaktight manner against the plate and that defines an opening in said plate, said base presenting at least one through orifice suitable for being closed by a movable member of the canister, said plate carrying a pump that co-operates with said canister by actuating said movable member to open said through orifice, which method is remarkable in that:

the pump is removed from the canister; and then a fluid connector is inserted to take the place of the pump, the fluid connector co-operating with said canister by actuating said movable member to open said through orifice in order to proceed with draining the tank via said fluid connector.

Thus, the outer casing of the canister includes at least one through orifice that is closed reversibly by a movable member, e.g. a slidable cylindrical member. The movable member allows the pump to be removed while the tank contains a liquid, e.g. for maintenance purposes.

According to the invention, instead of permanently fitting a quick drain cock on the plate, the pump is removed and replaced by quick drain equipment suitable for removing liquid from the tank to outside the tank. The quick drain equipment is thus provided with a fluid connector that occupies the position normally occupied by the pump in order to actuate the movable member and open each through orifice. The fluid connector defines a duct so the liquid passes through the through orifice and flows via the fluid connector to escape from the tank.

Contrary to existing prejudices, the invention avoids using a quick drain cock that is permanently mounted on a plate in order to achieve quick draining. Furthermore, the invention is that much more inventive in that drainage takes place via a canister, even though the main function of the canister is, on the contrary, to prevent such drainage.

Furthermore, the fluid connector is optionally connected to a valve, and after the fluid connector has been inserted to take the place of the pump, the valve is opened in order to discharge the liquid from the tank.

This characteristic enables drainage to take place at the desired moment. The valve may extend the fluid connector or it may be connected to said fluid connector, e.g. via a discharge pipe.

In addition to a method, the invention also provides a drain device, i.e. a fitted plate suitable for draining a tank by applying the above-described method and not requiring a quick drain cock to be permanently fastened to the plate.

According to the invention, a tank drain device is provided with a plate presenting an inside face suitable for facing the inside of the tank and an outside face opposite from the inside face, said plate including a canister having an outer casing provided with a base that is pressed in leaktight manner against the plate and that defines an opening in said plate, said base presenting at least one through orifice suitable for being closed by a movable member of the canister, said plate carrying a removable pump that co-operates with said canister by actuating said movable member to open said through orifice.

The device comprises a hollow fluid connector that is removable and that can be arranged to take the place of the pump in order to co-operate with said movable member.

Thus, the pump is arranged inside the canister under normal conditions, i.e. when not performing maintenance or draining, and the fluid connector is arranged inside the canister when draining.

The device may also possess one or more of the following additional characteristics.

For example, it includes a valve in fluid flow connection with said fluid connector.

In a first embodiment, the fluid connector discharges the liquid contained in the tank without any control means. Conversely, in a second embodiment, a valve connected to the fluid connector constitutes control means for allowing or preventing discharge of the liquid contained in the tank, the valve being arranged downstream from the fluid connector in the fluid flow direction.

Furthermore, the device includes a discharge pipe connected to said fluid connector either directly or via a valve interposed between said discharge pipe and said fluid connector.

Thus, three variants may optionally be envisaged:

the fluid connector is extended by a valve leading to a discharge pipe;

the fluid connector is extended by a discharge pipe leading to a valve; or else the fluid connector is extended by a discharge pipe leading to the outside or to a dedicated container.

It is possible to envisage that the discharge pipe is in fluid flow connection with means for fastening to a drain container.

It should be observed that when the fluid connector is extended by a discharge pipe leading to a valve, the discharge pipe may be connected to the fastener means by the valve, the valve being secured to the fastener means.

Furthermore, the fluid connector may comprise a hollow body provided with a top edge suitable for co-operating with the movable member when the flow connector is in engaged in the canister, the body having at least one slot facing a through orifice when the body is inserted in the canister.

For example, the top edge is shaped to match a bottom edge of the movable member, or indeed presses against a rim of the movable member.

Furthermore, the invention provides a tank provided with the above device, and an aircraft including such a tank.

BRIEF DESCRIPTION OF THE DRAWINGS

The invention and its advantages appear in greater detail in the context of the following description of embodiments given by way of illustration with reference to the accompanying figures, in which:

FIG. 3 shows a device of the invention; and

Elements shown in more than one of the figures are given the same references in each of them.

DETAILED DESCRIPTION OF THE PREFERRED EMBODIMENT

Figure 1:
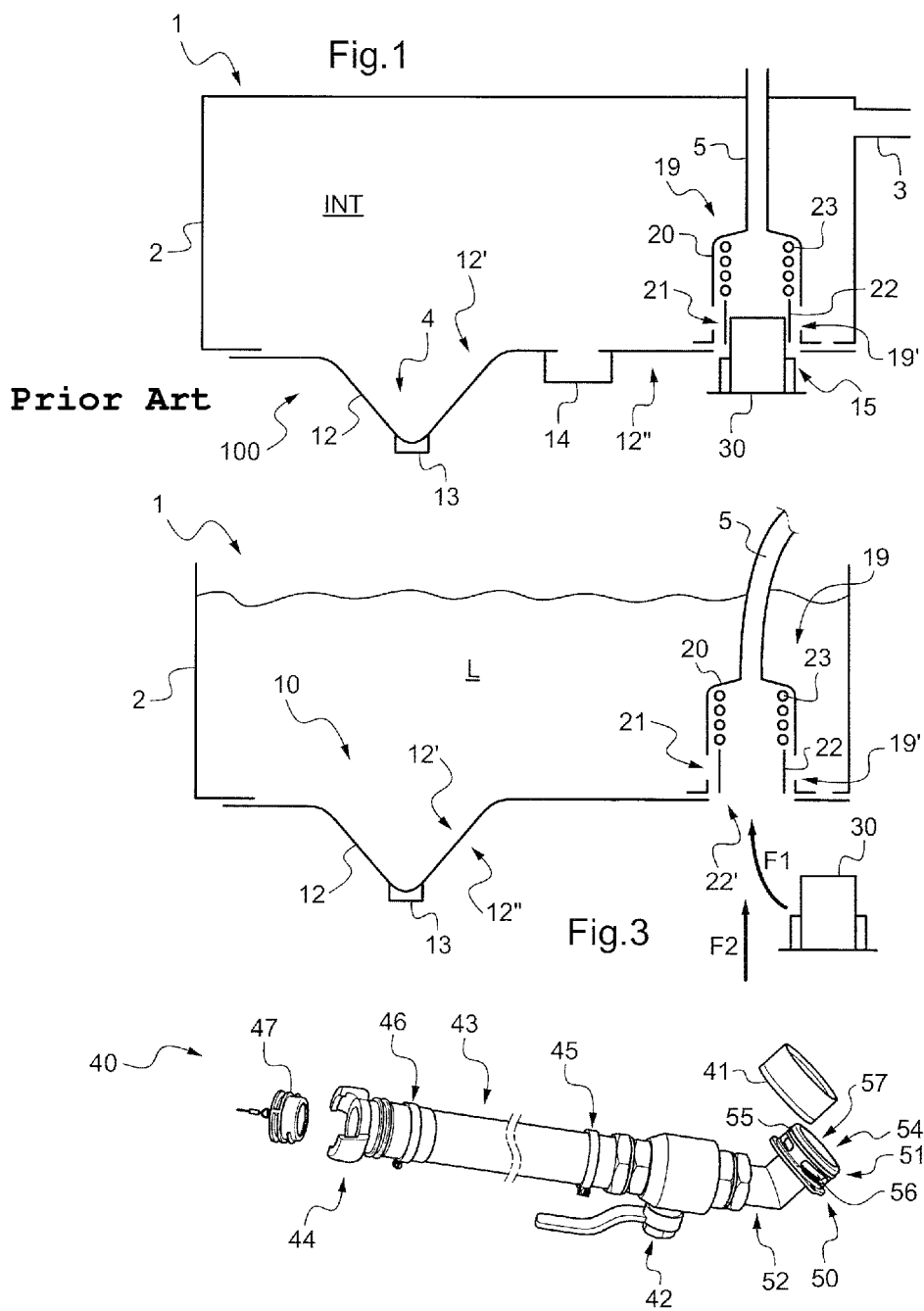
FIGS. 1 and 2 show a plate fitted in accordance with the prior art.
Figure 2:
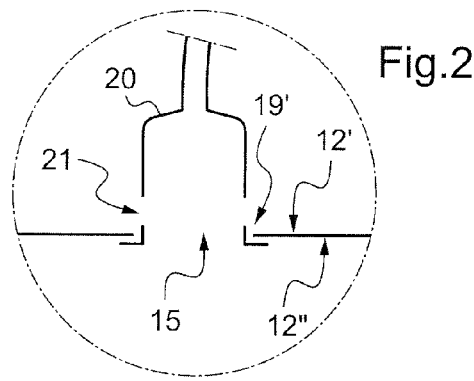

FIGS. 1 and 2 show an aircraft 1 provided with a tank 2, such as a flexible fuel tank fitted with an air vent 3 and an access 4 to the inside INT of the tank 2.

The access 4 is closed by a device 100 of the prior art that serves in particular to enable the tank 2 to be drained.

The prior art device 100 is a plate fitted with a plate 12 proper presenting an inside face 12' directed towards the inside INT of the tank 2, and an outside face 12" that is opposite from the inside face 12'.

Furthermore, the plate 12 also presents a well including bleed means 13, and a quick drain cock 14.

Furthermore, the plate has an opening 15 through which there is inserted the cartridge of a pump 30, e.g. a booster pump for feeding fuel to an engine.

In order to enable the pump 30 to be removed while the tank 2 is full of liquid, the device 100 includes a canister 19 having an outer casing 20 with a base 19' fastened in leaktight manner against the plate 12 by conventional means of the screw and gasket type, for example. The outer casing 20 is fastened to the inside face 12' of the plate in the variant of FIG. 1, whereas the outer casing 20 is fastened to the outside face 12" of the plate in the variant of FIG. 2.

The base 19' defines the opening 15. In fact, the pump 30 is inserted inside the canister 19, and in particular of the outer casing 20. Furthermore, the base 19' possesses at least one through orifice 21, with the liquid from the tank reaching the pump 30 via the through orifice 21. It is common practice to fit the through orifice 21 with a filter.

Furthermore, the canister 19 opens out to a feed pipe 5 leaving the tank 2. When the pump 30 is in operation, the liquid from the tank enters into the canister 19 and is then propelled by the pump 30 into the feed pipe 5, e.g. leading to an engine.

Finally, the canister 19 presents a movable member 22 fastened to a resilient member such as a spring bearing against the outer casing 20, i.e. a cylindrical sliding member in FIGS. 1 and 2.

In the absence of the pump, the resilient member actuates the movable member 22, e.g. urging it against an abutment located on the base 19' so that the movable member closes the through orifice 21. Liquid can then no longer penetrate into the canister 19 and there is no risk of liquid escaping from the tank 2.

When the pump 30 is inserted in the canister 19, the pump 30 actuates the movable member 22, which releases the through orifice 21. For example, the pump 30 pushes back the movable member 22.

In the prior art, the canister 19 thus has the function of preventing the tank being drained in the absence of the pump 30, with draining being provided by a dedicated quick drain cock 14 that is permanently fastened to the plate 12. Such a quick drain cock 14 constitutes useless extra weight except when draining the tank.

FIG. 3 shows a preferred embodiment of a device 10 of the invention, specifically for draining a liquid L contained in a tank 2, a tank 2 of an aircraft 1, for example.

The device 10 comprises a plate 12 having an inside face 12' directed towards the inside INT of the tank 2, and an outside face 12" opposite from the inside face 12'.

Furthermore, the plate 12 shown diagrammatically optionally presents a well that includes bleed means 13.

Furthermore, the plate 12 includes an opening 15 passing through the thickness of the plate, from the inside face 12' to the outside face 12" of the plate. The device 10 then comprises a canister 19 having an outer casing 20 with a base 19' that is fastened in leaktight manner against the inside face 12' using conventional means, e.g. of the screw and gasket type. The base 19' then defines and surrounds the opening 15. It can be understood that the base of the outer casing can be fastened in leaktight manner against the outside face 12" of the plate 12, this base passing through and defining the opening 15, in the same manner as shown in FIG. 2.

Furthermore, the base 19' possesses at least one through orifice 21, possibly fitted with a filter (not shown).

Finally, the canister 19 presents a movable member 22 such as a cylindrical sliding member that is fastened to a resilient member such as a spring 23 bearing against the outer casing 20. The resilient member urges the movable member 22, e.g. by pressing it against an abutment located on the base 19', so that said movable member closes each through orifice 21.

In addition, the device 10 includes a pump 30, e.g. a booster pump for feeding fuel to an engine. The pump 30 is removable and may co-operate with the canister 19, by being inserted in the canister 19 along arrow F1. The pump may be fastened to the outside face 12" or indeed to the canister 19.

It should be observed that the pump 30 actuates the movable member 22 of the canister 19 to release each through orifice 21 of the outer casing 20. For example, the pump 30 pushes the movable member 22.

In addition, the canister 19 opens out to a feed pipe 5 leaving the tank 2. When the pump 30 is in operation, liquid from the tank enters into the canister and is then propelled by the pump 30 into the feed pipe 5, e.g. going to an engine.

Unlike a prior art drain device 100, the invention does not use a quick drain cock 14 that is permanently fastened to the plate 12.

The device 10 of the invention provides removable quick drain equipment 40 through which liquid can flow and suitable for being arranged in the place provided for the pump. Thus, either the pump 30 or the quick drain equipment 40 is arranged within the canister 19, depending on requirements.

Under such circumstances, draining is performed not by using a quick drain cock 14, but instead through the canister 19, even though its primary function is the opposite i.e. to prevent liquid from escaping from the tank.

More precisely, the quick drain equipment 40 comprises a fluid connector 50 suitable for co-operating with the movable member 22 of the canister 19 in order to open the through orifice 21. The fluid connector 50 defines a duct directed towards the outside of the tank, and the liquid contained in the tank penetrates into the canister 19 and then escapes therefrom via the fluid connector 50 of the quick drain equipment 40.

At its first end 51, the fluid connector 50 possesses a substantially cylindrical hollow body 54 provided with a top edge 57, and at its second end 52 it possesses a bend portion. Since the body 54 is hollow, the body 54 presents a duct in which a liquid can flow.

By way of example, the circular edge is shaped to match a bottom edge 22' of the movable member 22. For example, the bottom edge 22' describes a circle of given diameter and the top edge 57 describes an identical circle.

When an operator inserts the fluid connector 50 into the canister 19, in the same manner as inserting the pump, the fluid connector actuates the movable member 22 via its top edge 57.

Furthermore, the body 54 of the fluid connector 50 has at least one slot 56 suitable for facing a through orifice 21 when the fluid connector is inserted in the canister 19.

In addition, the body 54 of the fluid connector 50 may be fitted with sealing gaskets 55 on either side of the slot 56.

Finally, the body possesses means for fastening it to the canister 19 or to the outside face 12" of the plate, such as a screw, for example.

The quick drain equipment 40 optionally also presents a valve 42 arranged downstream from the fluid connector 50 in the liquid flow direction through said quick drain equipment 40.

The valve 42 is then in fluid flow connection with the second end 52 of the fluid connector 50, either via a duct, or else directly as shown in FIG. 3.

Furthermore, the quick drain equipment 40 is provided, in the variant shown, with a discharge pipe 43 enabling the liquid from the tank coming from the fluid connector to be directed towards a drain container, e.g. a tanker truck. The discharge pipe shown is relatively short in length, but it will be understood that it could be longer without going beyond the ambit of the invention.

The discharge pipe 43 is in fluid flow connection with the second end 52 of the fluid connector 50. In FIG. 3, the discharge pipe 43 is connected indirectly to the second end 52 of the fluid connector 50 via the valve 42 and a clamping collar 45, but it could be connected directly to the second end in another variant.

The discharge pipe 43 is also connected to fastener means 44. More precisely, the discharge pipe 43 is fastened to the fastener means 44 via a clamping collar 46. The fastener means 44 are of conventional type so as to be suitable for connection to a conventional endpiece, e.g. an endpiece provided on a tanker truck.

Finally, when the quick drain equipment 40 is not in use, the operator places a first cap 41 on the body 54 and a second cap 47 on the fastener means 44.

Figure 4:
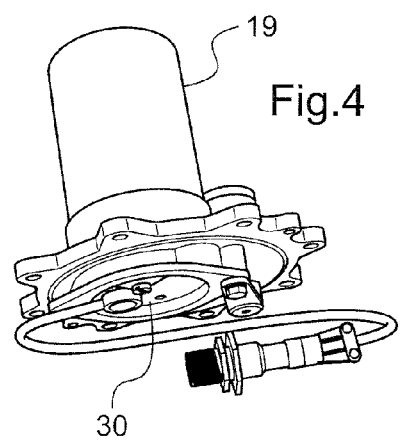
FIGS. 4 to 6 serve to explain the method of the invention.
Figure 5:
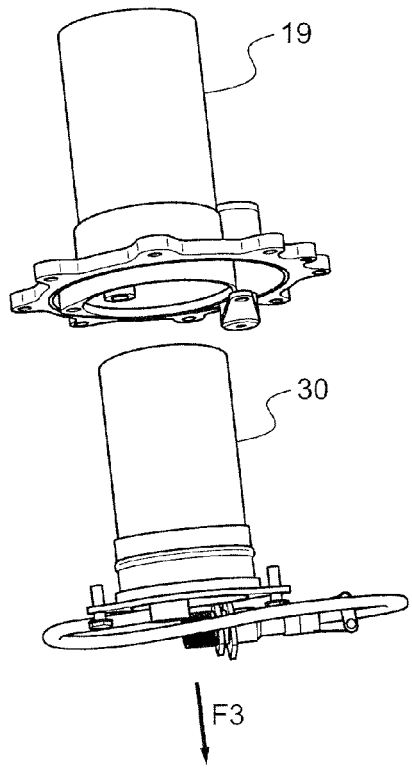
Figure 6:
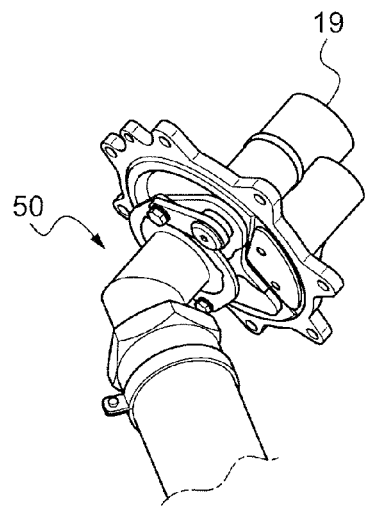

FIGS. 4 to 6 show the method of quickly draining the tank using the quick drain equipment 40 of the invention.

In FIG. 4, prior to draining, the pump 30 is inserted in the canister 19.

Then, with reference to FIG. 5, in order to drain the tank, an operator removes the pump 30 along arrow F3. Thereafter, with reference to FIG. 6, the operator puts the quick drain equipment into place by arranging the body of the fluid connector 50 in the place previously occupied by the pump in the canister 19.

When the device 10 is provided with quick drain equipment 40 including a valve 42, the operator then opens the valve 42 in order to begin draining.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A method of draining a tank having a plate presenting an inside face facing the inside (INT) of the tank and an outside face opposite from the inside face, the plate including a canister having an outer casing provided with a base that is pressed in leaktight manner against the plate and that defines an opening in the plate, the base presenting at least one through orifice suitable for being closed by a movable member of the canister, the plate carrying a pump that co-operates with the canister by actuating the movable member to open the through orifice, the method comprising the steps of:
   removing the pump from the canister; and then
   inserting a fluid connector to take the place of the pump, the fluid connector co-operating with the canister by actuating the movable member to open the through orifice in order to proceed with draining the tank via the fluid connector.

2. A method according to claim 1, wherein the fluid connector is connected to a valve, and after the fluid connector has been inserted to take the place of the pump, the valve is opened.

3. The method of claim 1, wherein the fluid connector has a slot and the fluid connector, when cooperating with the canister, fluidly connects the slot in the fluid connector with the through orifice.

4. A device for quickly draining a tank and suitable for implementing the method according to claim 1, the tank being provided with a plate presenting an inside face suitable for facing the inside (INT) of the tank and an outside face opposite from the inside face, the plate including a canister having an outer casing provided with a base that is pressed in leaktight manner against the plate and that defines an opening in the plate, the base presenting at least one through orifice suitable for being closed by a movable member of the canister, the plate carrying a removable pump that co-operates with the canister by actuating the movable member to open the through orifice, wherein the device comprises a hollow and removable fluid connector suitable for being arranged to occupy the place of the pump in order to co-operate with the movable member.

5. A device according to claim 4, including a valve in fluid flow connection with the fluid connector.

6. A device according to claim 4, including a discharge pipe connected to the fluid connector either directly or via a valve interposed between the discharge pipe and the fluid connector.

7. A device according to claim 6, wherein the discharge pipe is in fluid flow connection via fastener means with a drain container.

8. A tank, including a device according to claim 4.

9. An aircraft, including a tank according to claim 8.

10. A device for draining a tank, the tank being provided with a plate presenting an inside face suitable for facing the inside of the tank and an outside face opposite from the inside face, the plate including a canister having an outer casing provided with a base that is pressed in leaktight manner against the plate and that defines an opening in the plate, the base presenting at least one through orifice suitable for being closed by a movable member of the canister, the plate carrying a removable pump that co-operates with the canister by actuating the movable member to open the through orifice, wherein the device comprises:
 a removable fluid connector suitable for being arranged to occupy the place of the pump in order to co-operate with the movable member to actuate the movable member to open the orifice, the fluid connector having a hollow body provided with a top edge suitable for co-operating with the movable member, the body including at least one slot in register with a through orifice in the canister when the body is inserted in the canister.

11. A device according to claim 10, including a valve in fluid flow connection with the fluid connector.

12. A device according to claim 10, including a discharge pipe connected to the fluid connector either directly or via a valve interposed between the discharge pipe and the fluid connector.

13. A device according to claim 12, wherein the discharge pipe is in fluid flow connection via fastener means with a drain container.

14. A device according to claim 10, further comprising a first sealing gasket disposed on the hollow body on a first side of the slot and a second sealing gasket disposed on the hollow body on a second side of the slot.

15. A device according to claim 10, wherein the top edge of the hollow body is a circular edge shaped to match a bottom edge of the movable member.

16. A tank, including a device according to claim 10.

17. An aircraft, including a tank according to claim 16.

18. A method of draining a tank having a plate, the plate including a canister having an outer casing provided with a base that is pressed against the plate and that defines an opening in the plate, the base presenting at least one through orifice suitable for being closed by a movable member of the canister, the plate carrying a pump that co-operates with the canister by actuating the movable member to open the through orifice, the method comprising:
 removing the pump from the canister; and then
 inserting a fluid connector into the canister, the fluid connector having a hollow body provided with a top edge suitable for co-operating with the canister by actuating the movable member to open the through orifice, the body including at least one slot in fluid communication with the through orifice in the canister when the body is inserted in the canister in order to proceed with draining the tank.

19. A method according to claim 18, wherein the at least one slot is in register with the through orifice in the canister when the body is inserted in the canister.

20. A method according to claim 18, wherein the fluid connector is connected to a valve, the method further comprising opening the valve after the fluid connector has been inserted to take the place of the pump.

* * * * *